(12) United States Patent
Lighty et al.

(10) Patent No.: US 10,815,887 B2
(45) Date of Patent: *Oct. 27, 2020

(54) GAS TURBINE ENGINE LUBRICATION SYSTEM

(71) Applicant: Rolls-Royce Corporation, Indianapolis, IN (US)

(72) Inventors: Kerry J. Lighty, Avon, IN (US); Larry A. Junod, Greencastle, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 283 days.

This patent is subject to a terminal disclaimer.

(21) Appl. No.: 15/888,641

(22) Filed: Feb. 5, 2018

(65) Prior Publication Data

US 2018/0156118 A1 Jun. 7, 2018

Related U.S. Application Data

(63) Continuation-in-part of application No. 14/109,114, filed on Dec. 17, 2013, now Pat. No. 9,488,104, and a continuation of application No. 14/207,949, filed on Mar. 13, 2014, now Pat. No. 9,915,203.

(60) Provisional application No. 61/801,866, filed on Mar. 15, 2013, provisional application No. 61/802,155, filed on Mar. 15, 2013.

(51) Int. Cl.
| | | |
|---|---|---|
| *F02C 7/06* | (2006.01) |
| *F16N 7/38* | (2006.01) |
| *F02C 7/12* | (2006.01) |
| *F01D 25/18* | (2006.01) |
| *F01D 25/12* | (2006.01) |
| *F01D 25/08* | (2006.01) |
| *F02C 7/14* | (2006.01) |
| *F16N 39/02* | (2006.01) |

(52) U.S. Cl.
CPC ............... *F02C 7/06* (2013.01); *F01D 25/08* (2013.01); *F01D 25/125* (2013.01); *F01D 25/18* (2013.01); *F02C 7/12* (2013.01); *F02C 7/14* (2013.01); *F16N 7/385* (2013.01); *F16N 39/02* (2013.01); *F16N 2210/02* (2013.01); *Y02T 50/675* (2013.01)

(58) Field of Classification Search
CPC ...... F02C 7/06; F02C 7/08; F02C 7/10; F02C 7/12; F02C 7/14
USPC ........................................................ 415/111
See application file for complete search history.

(56) References Cited

U.S. PATENT DOCUMENTS

| 2,531,411 A * | 11/1950 | Davenport ............. F01D 25/18 |
| | | 184/6.26 |
| 2,883,152 A | 4/1959 | Turunen et al. |
| 3,321,910 A | 5/1967 | Davies et al. |

(Continued)

OTHER PUBLICATIONS

Forster, et al., "Computer Modeling of Heat Generation in Vapor Lubricated Bearings for Gas Turbines," May 1998, pp. 1-10 (10 pages).

(Continued)

*Primary Examiner* — Moshe Wilensky
*Assistant Examiner* — Jason Mikus
(74) *Attorney, Agent, or Firm* — Barnes & Thornburg LLP (57) ABSTRACT

A lubrication system for a gas turbine engine is disclosed. The lubrication system is configured to provide pressurized air and lubricant to a bearing sump of the gas turbine engine to cool and lubricate a bearing included in the bearing sump.

12 Claims, 4 Drawing Sheets

(56) References Cited

U.S. PATENT DOCUMENTS

| | | |
|---|---|---|
| 4,136,516 A | 1/1979 | Corsmeier |
| 4,717,000 A | 1/1988 | Waddington et al. |
| 4,888,947 A | 12/1989 | Thompson |
| 4,991,391 A | 2/1991 | Kosinski |
| 5,018,601 A | 5/1991 | Waddington et al. |
| 5,498,352 A | 3/1996 | Graham et al. |
| 5,579,631 A | 12/1996 | Chen et al. |
| 5,584,360 A | 12/1996 | Wedeven |
| 5,636,708 A | 6/1997 | Wedeven et al. |
| 5,716,911 A | 2/1998 | Furey et al. |
| 5,752,773 A * | 5/1998 | Rosado ............... F16C 33/44 384/527 |
| 6,295,803 B1 | 10/2001 | Bancalari |
| 6,672,075 B1 | 1/2004 | Sandu et al. |
| 7,475,549 B2 | 1/2009 | Alexander et al. |
| 7,748,209 B1 | 7/2010 | Schopf et al. |
| 7,984,792 B2 | 7/2011 | Hoffmann et al. |
| 8,215,895 B2 | 7/2012 | Henry et al. |
| 9,222,411 B2 | 12/2015 | Sennoun |
| 2009/0220330 A1 | 9/2009 | Henry et al. |
| 2010/0154434 A1 | 6/2010 | Kubota et al. |

OTHER PUBLICATIONS

Wagner, et al, "Vapor Phase Lubrication for Expendable Gas Turbine Engines," Apr. 2000, pp. 185-190 (6 pages).

Forster, et al, "High Temperature Lubrication of Rolling Contacts with Lubricants Delivered from the Vapor Phase and as Oil-Mists," Jan. 1997, pp. 1-261 (261 pages).

Forster, et al, "Rolling Contact Testing of Vapor Phase Lubricants—Part II: System Performance Evaluation," Sep. 16, 1996, 493-499 (7 pages).

International Search Report for PCT International Application Serial No. PCT/US2013/075839, completed Apr. 11, 2017, (8 pages).

* cited by examiner

GAS TURBINE ENGINE LUBRICATION SYSTEM

CROSS REFERENCE TO RELATED APPLICATIONS

This application claims priority to and the benefit of U.S. Provisional Patent Application No. 61/801,866, filed 15 Mar. 2013, U.S. Provisional Patent Application No. 61/802,155, filed 15 Mar. 2013, U.S. Non-provisional patent application Ser. No. 14/109,114, filed 17 Dec. 2013, U.S. Non-provisional patent application Ser. No. 14/207,949, filed 13 Mar. 2014, the disclosure of each being expressly incorporated herein by reference.

TECHNICAL FIELD

The present invention generally relates to gas turbine engines, and more particularly, but not exclusively, to bearing lubrication systems for gas turbine engines.

BACKGROUND

Typical bearing lubrication systems for gas turbine engines use heat exchangers to absorb heat from oil that is recirculated through the system once the oil is delivered to bearings included in the gas turbine engine. Heat from the oil is transferred by the heat exchanger to either air passing through the gas turbine engine or fuel injected into the gas turbine engine. Those systems are difficult to integrate into gas turbine engines producing propulsive thrust at supersonic speeds because the temperature of the air passing through the gas turbine engine and the temperature of the fuel injected into the gas turbine engine is often higher than the bearings can withstand in normal operating conditions. In view of the difficulty inherent in recirculating systems, providing a bearing lubrication system for a gas turbine engine producing propulsive thrust at supersonic speeds that does not use recirculated oil remains an area of interest.

SUMMARY

An illustrative gas turbine engine is adapted for one-time or limited use in high subsonic or supersonic applications. The gas turbine engine includes an engine core, a bearing sump, and a non-recirculating lubrication system coupled to the bearing sump. The non-recirculating lubrication system is configured to provide air and lubricant to the bearing sump to lubricate and cool a bearing included in the bearing sump.

According to one aspect of the present disclosure, a gas turbine engine may include an engine core, a bearing sump, and a lubrication system. The engine core may include an inlet, a compressor, a turbine, and an exhaust. A bearing sump may be arranged in the engine core and may operate at an operational range of about 600 degrees Fahrenheit to about 1,000 degrees Fahrenheit. The lubrication system may be configured to provide a tertiary-butyl phenyl phosphate (TBPP) lubricant to the bearing sump as a vapor.

In some embodiments, the lubrication system may include a lubrication reservoir configured to store TBPP lubricant as a liquid.

In some embodiments, the lubrication system may further include an air system coupled to the bearing sump and the lubrication reservoir. The lubrication system may be configured to provide bearing air having a temperature in a vaporization range to the bearing sump to cause a steel bearing race to have a temperature in the vaporization range.

In some embodiments, the lubrication system may further include a mister coupled to the lubrication reservoir to deliver TBPP lubricant as a liquid into the bearing air being delivered to the bearing sump. The bearing air may cause the TBPP lubricant to change from a liquid to the vapor before the bearing air interacts with the bearing sump.

In some embodiments, the lubrication reservoir may be located outside the engine core.

In some embodiments, the lubrication reservoir may include an exhaust-to-lubricant heat exchanger that may be configured to transfer heat from exhaust gas provided by the exhaust to the TBPP lubricant to cause the TBPP lubricant to have a temperature in a liquid range and be less viscous when the gas turbine engine is in a start-up mode of operation.

In some embodiments, exhaust gas may be blocked from flowing to the exhaust-to-lubricant heat exchanger when the gas turbine engine is in a steady-state mode of operation and heat is imparted to the lubrication reservoir from outside air flowing around the engine core to maintain the TBPP lubricant in the liquid range when the gas turbine engine is in the steady-state mode of operation.

In some embodiments, the lubrication reservoir may further include a layer of insulation coupled to an exterior surface of the lubrication reservoir. The layer of insulation may be configured to control transfer of heat from the outside air to the lubricant.

In some embodiments, the lubrication system may include an air system coupled to the bearing sump to provide air having a first temperature in a vaporization range to the bearing sump and the vapor may be entrained in the air.

In some embodiments, the air system may include a fuel-to-air heat exchanger configured to provide source air having a second temperature during startup. The air system may further include an air-to-air heat exchanger that may be configured to receive the source air from the fuel-to-air heat exchanger. The air-to-air heat exchanger may be coupled to the exhaust to receive exhaust gas having a third temperature and may be configured to transfer heat from the exhaust gas to the source air to cause the source air to have the first temperature in the vaporization range. The exhaust gas may have a third temperature greater than the second temperature.

In some embodiments, the source air may have a fourth temperature greater than the second temperature when the gas turbine engine is in a steady-state mode of operation. The exhaust gas may be blocked from flowing to the air-to-air heat exchanger when the gas turbine engine is in a steady-state mode of operation and inlet air having a fifth temperature may be provided to the air-to-air heat exchange to cause heat to be transferred from the source air so that the bearing sump remains in the operational range when the gas turbine engine is in the steady-state mode of operation. The fifth temperature may be less than the fourth temperature.

In some embodiments, the lubrication reservoir may include an exhaust-to-lubricant heat exchanger that may be configured to transfer heat from exhaust gas having the third temperature to the TBPP lubricant to cause the TBPP lubricant to have a temperature in a liquid range and be less viscous when the gas turbine engine is in a start-up mode of operation.

In some embodiments, exhaust gas may be blocked from flowing to the exhaust-to-lubricant heat exchanger when the gas turbine engine is in a steady-state mode of operation. Heat may be imparted to the lubrication reservoir from outside air flowing around the engine core to maintain the TBPP lubricant in the liquid range. The outside air may have a temperature above the liquid range.

In some embodiments, the lubrication reservoir may further include a layer of insulation coupled to an exterior surface of the lubrication reservoir. The layer of insulation may be configured to control transfer of heat from the outside air to the lubricant.

In some embodiments, the bearing sump may include a bearing including a steel race, ceramic rolling elements, a carbon-composite cage, and an initial dry-film solid coating applied to the steel race.

In some embodiments, the initial dry-film solid coating may be worn away from the steel race during a start-up mode of operation of the gas turbine engine. As a result, the steel race may be exposed to the vapor.

In some embodiments, the vapor may react with the steel race and form a solid, lubricious layer on a surface of the steel race during a steady-state mode of operation of the gas turbine engine.

According to another aspect of the present disclosure, a gas turbine engine may include an engine core, a bearing sump, and a lubrication system. The engine core may include an inlet, a compressor, a turbine, and an exhaust. The bearing sump may be located in the engine core and may operate at an operational range of about 600 degrees Fahrenheit to about 1,000 degrees Fahrenheit. The lubrication system may include a lubrication reservoir located outside the engine core. The lubrication reservoir may be configured to provide a tertiary-butyl phenyl phosphate (TBPP) lubricant as a liquid lubricant to a stream of air having a temperature in a range of about 600 degrees Fahrenheit to about 800 degrees Fahrenheit to cause the TBPP lubricant to change to a vapor lubricant and be delivered to the bearing sump.

In some embodiments, the bearing sump may include a front seal, a first rear seal spaced apart from the front seal to locate a bearing between the front seal and the first rear seal, a second rear seal located in spaced-apart relation to the first rear seal to locate the first rear seal between the bearing and the second rear seal, and a vent formed in the bearing sump and arranged to open into the bearing sump between the first and the second rear seals.

In some embodiments, the front seal, the first rear seal, and the second rear seal may be all labyrinth seals and may be configured to move the stream of air and vapor lubricant in only one direction from the front seal towards and through the vent.

Further embodiments, forms, features, aspects, benefits, and advantages of the present application shall become apparent from the description and figures provided herewith.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
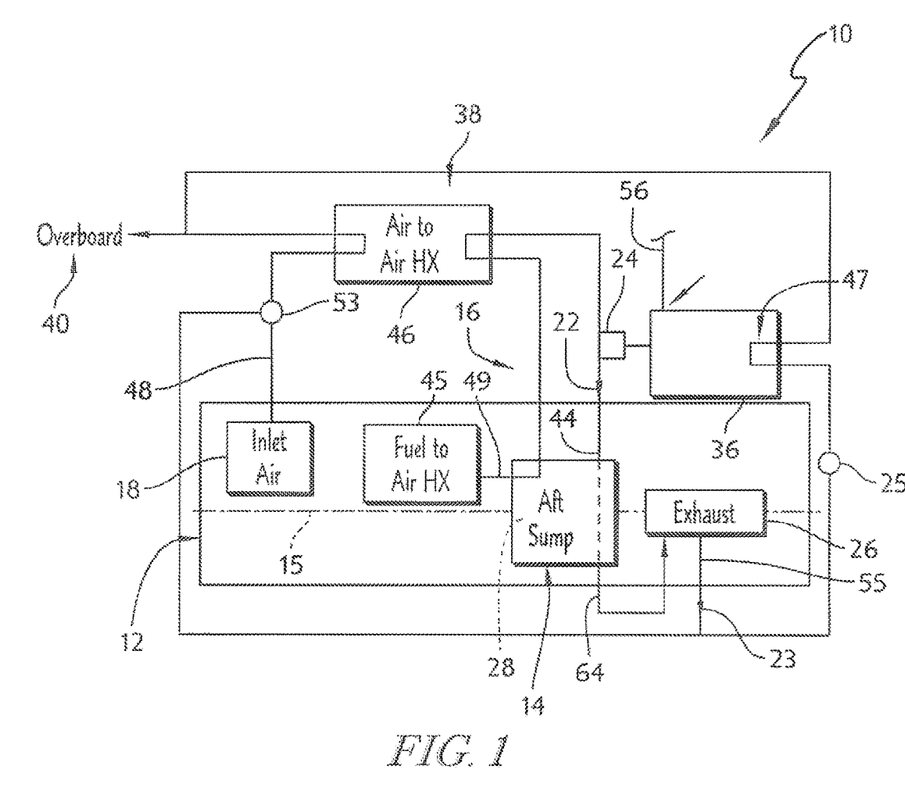
FIG. 1 is a diagrammatic view of a portion of a gas turbine engine including an aft sump in which a bearing is located and provided lubrication by a non-recirculating lubrication system.

An illustrative gas turbine engine 10 is adapted for one-time or limited use in high subsonic or supersonic applications as shown in FIG. 1. The gas turbine engine 10 includes an engine core 12, an aft bearing sump 14, and a non-recirculating lubrication system 16. The non-recirculating lubrication system 16 is configured to provide pressurized air from the engine core 12 and lubricant to the aft bearing sump 14 to lubricate one or more bearings. In one example, a bearing 28 included in the aft bearing sump 14 is lubricated by the non-recirculating lubrication system 16. The non-recirculating lubrication system 16 then conducts the lubricant and the pressurized air to the engine exhaust so that the expended lubricant is not recirculated back to the aft bearing sump 14.

Figure 1A:
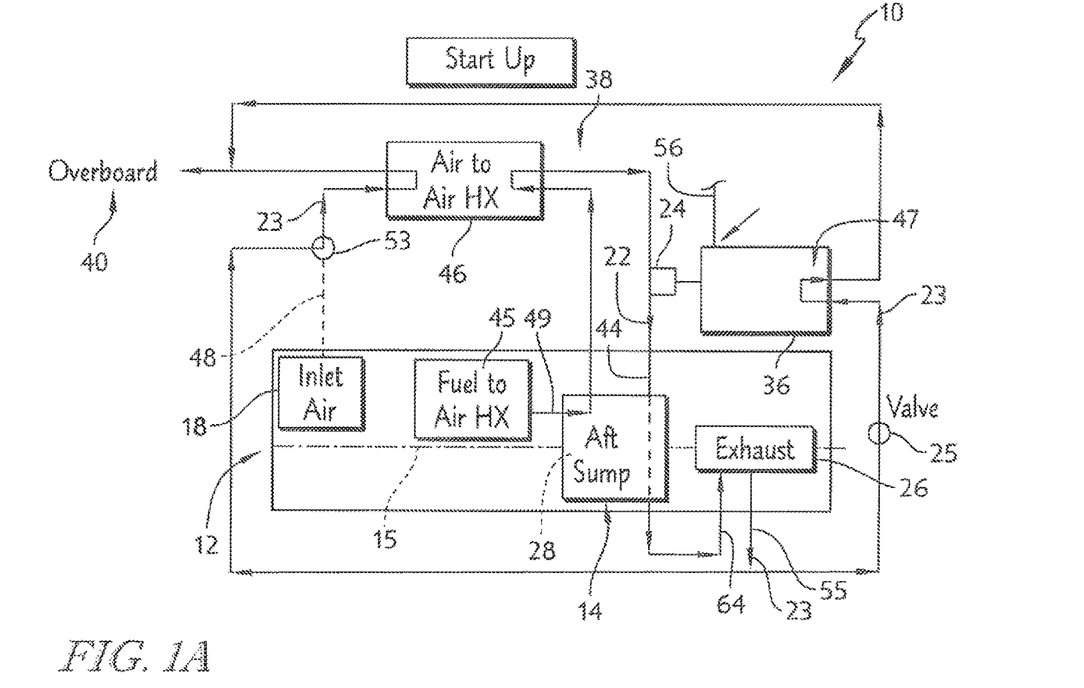
FIG. 1A is a view similar to FIG. 1 showing the non-recirculating lubrication system in a start-up mode in which exhaust gas is used to provide heat to both a lubrication reservoir included in the non-recirculating lubrication system and an air-to-air heat exchanger to heat lubricant-supply air.
Figure 1B:
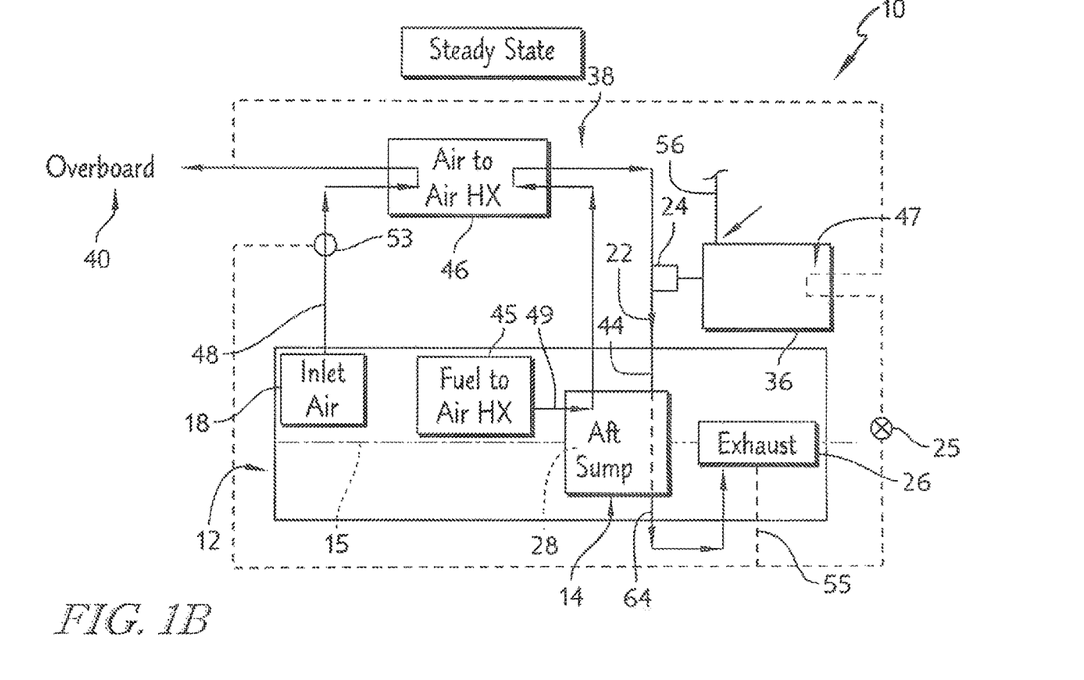
FIG. 1B is a view similar to FIG. 1A showing the lubricant system in a steady-state mode in which exhaust gas is blocked from flowing to the lubrication reservoir and the air-to-air heat exchanger and relatively cooler inlet air is provided to the air-to-air heat exchanger to cool the lubricant supply air.
Figure 2:
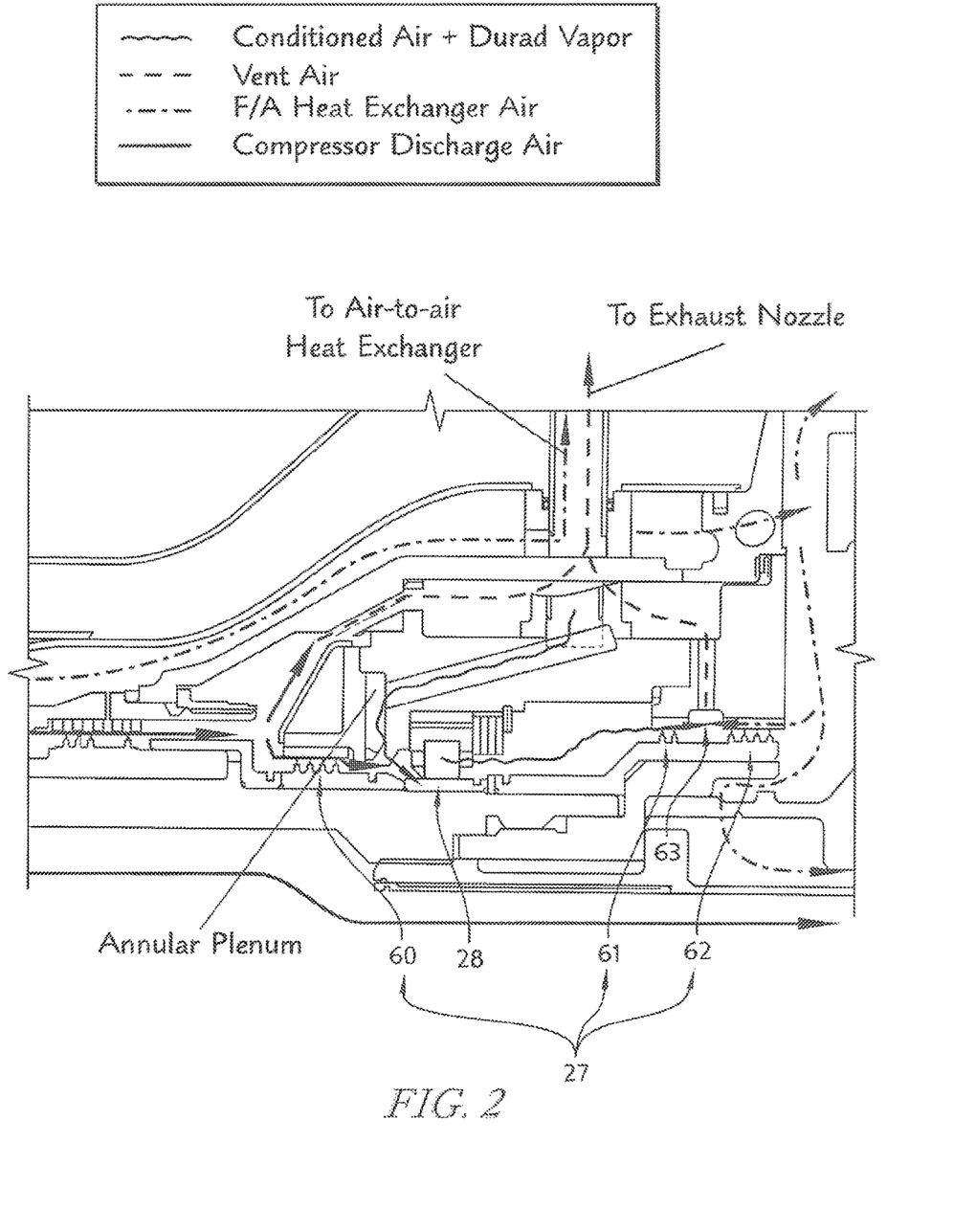
FIG. 2 is a sectional view of a portion of a gas turbine engine showing how various flows are directed through the aft sump by labyrinth seals included in the aft sump.
Figure 3:
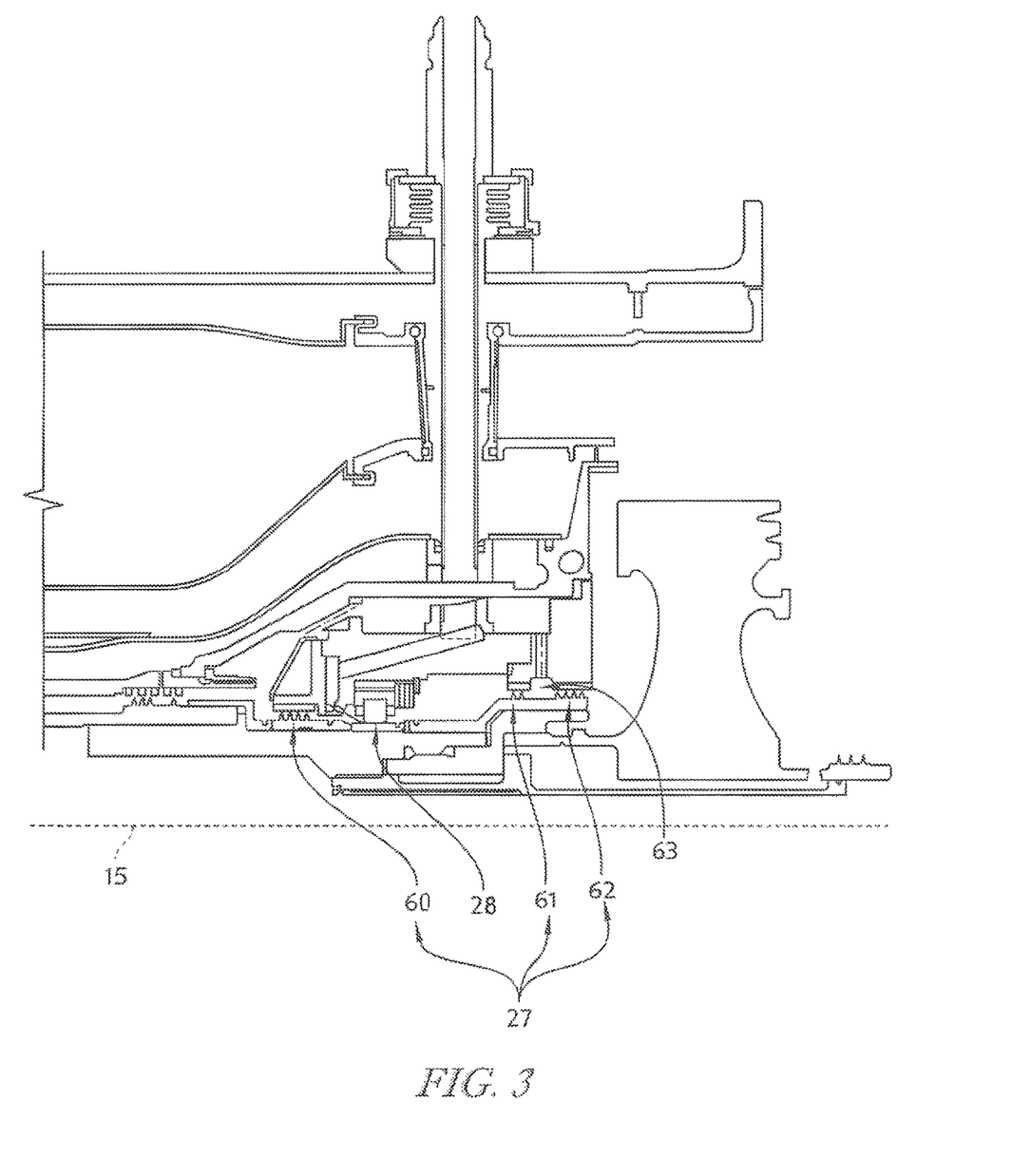
FIG. 3 is a sectional view showing a larger portion of the gas turbine engine of FIG. 2.

A portion of engine core 12 is illustratively shown in FIGS. 2 and 3 as being surrounded by a housing that supports an inlet 18, a compressor (not shown), a combustor (not shown), a turbine (not shown), and an exhaust 26 of the engine core 12. The aft bearing sump 14 is arranged in the engine core 12 within the housing as shown in FIGS. 1-3. The non-recirculating lubrication system 16 is also mounted to the housing and extends into the aft bearing sump 14 inside the housing.

The engine core 12 of the gas turbine engine 10 includes the inlet 18, the compressor, the combustor, the turbine, and the exhaust 26. The inlet 18 is configured to receive atmospheric air and deliver the atmospheric air to the compressor. The compressor is configured to increase the pressure and the temperature of the atmospheric air and deliver the compressed air at the increased pressure and temperature to the combustor. The combustor is configured to mix the compressed air with fuel, ignite the air/fuel mixture, and deliver the resulting hot, high-pressure gasses to the turbine. The turbine is configured to convert the hot, high-pressure gasses provided by the combustor to mechanical energy (i.e., power) that is used to drive one or more components of the gas turbine engine (e.g., the compressor) and deliver the hot, high-pressure gasses to the exhaust 26. The exhaust 26 is configured to discharge the hot, high-pressure gasses from the turbine to a low pressure air stream producing thrust.

Rotating components of the compressor and the turbine are mounted on a shaft 15 and coupled to one another through the shaft so that power extracted by the turbine is transmitted to the compressor via the shaft 15. The shaft 15 is supported for rotation at one end by a bearing associated with the compressor, and the shaft 15 is supported for rotation at an opposite end by the bearing 28 associated with the turbine as suggested in FIGS. 1-3.

The aft bearing sump 14 is shown diagrammatically in FIG. 1 and includes the bearing 28 and an airflow management system 27 as suggested in FIGS. 2 and 3. The bearing 28 is located in the airflow management system 27 and arranged to cause vaporized lubricant entrained in the air to move through the aft bearing sump 14 over the bearing 28 in only a direction from fore to aft. As a result, the bearing 28 is lubricated.

In one example, the bearing 28 includes a steel race, ceramic rolling elements, a carbon-composite cage, and an initial dry-film solid coating applied to the steel race. The non-recirculating lubrication system 16 provides lubricant at an appropriate temperature to cause the lubricant to react with the steel race in a vapor form and form a solid lubricious layer on an outer surface of the steel race. The ceramic rolling elements and composite cage generate less heat than steel counterparts and do not react with the vaporized lubricant. The initial dry-film solid coating is worn away during a start-up mode of operation of the gas turbine engine 10 but is replaced by the lubricious solid layer that bonds to the exposed steel surface.

In one example, the vapor form of the lubricant reacts with iron in the steel to form a lubricious compound. During operation, the lubricious compound is worn away with use. As the vapor form of the lubricant reacts with the iron, the available iron is depleted over time. Thus, the lubricious compound is only able to be formed over a limited time.

The non-recirculating lubrication system 16 is configured to provide a mixture of pressurized air and vapor lubricant to the aft bearing sump 14 to lubricate and cool the bearing 28 during operation of the gas turbine engine 10. The non-recirculating lubrication system 16 includes a lubrication reservoir 36, an air system 38, a vent 40, an exhaust vent line 64, and a mister 24 as shown in FIGS. 1-1B. The mister 24 may be a nozzle configured to inject liquid lubricant from the lubrication reservoir 36 into a delivery air stream 22 supplied to the aft bearing sump 14 as suggested in FIGS. 1-1B so that the bearing 28 is adequately lubricated and cooled during operation of the gas turbine engine 10.

As suggested in FIGS. 1-1B, the lubrication reservoir 36 is configured to provide a liquid lubricant stored therein to the mister 24 which injects liquid lubricant into the delivery air stream 22. The lubrication reservoir 36 is located outside the engine core 12 so as to shield the lubrication reservoir 36 from high temperatures inside the engine core 12. The lubrication reservoir 36 also includes insulation to shield the lubricant inside the lubrication reservoir 36 from high temperatures outside the engine core 12. In one example, outside air flowing around the engine core during steady state air may have temperatures of about 700 degrees Fahrenheit when the vehicle is traveling at about Mach three.

The lubrication reservoir 36 also includes an exhaust-to-lubricant heat exchanger 47 which transfers heat from an exhaust flow 23 during startup to increase the temperature of the lubricant in the lubrication reservoir 36 to within a liquid range during startup as shown in FIG. 1A. The liquid range of the lubricant is a temperature range in which the lubricant is a liquid and flows readily but is not a vapor. After startup occurs and the lubricant is in the liquid range, a first valve 25 included in the air system 38 closes blocking the exhaust flow 23 from passing through the exhaust-to-lubricant heat exchanger 47 located in the lubrication reservoir 36 as shown in FIG. 1B. The lubricant in the lubrication reservoir 36 is maintained in the liquid range by the insulation surrounding the lubrication reservoir 36. The insulation shields the lubrication reservoir from hot temperatures provided outside the engine core by the outside air so that the lubrication remains a liquid.

The lubricant is delivered from the lubrication reservoir 36 in a liquid form to the mister 24 which injects the liquid lubricant into the delivery air stream 22. The injected lubricant is then further heated so as to be in a vaporization range. When in the vaporization range, the liquid lubricant undergoes a phase change from a liquid to a vapor. The vaporized lubricant is then delivered to the aft bearing sump 14 where it lubricates the bearing 28.

In one example, the lubricant may be a specialized lubricant such as tertiary-butyl phenyl phosphate (TBPP) which is commercially known as DURAD® 620B or any other suitable bearing lubricant which is a liquid in the liquid range, a vapor in the vapor range, and forms a solid lubricious layer when reacting with steel when in an operational range of the aft bearing sump 14. In one example, the liquid range is greater than about 130 degrees Fahrenheit and less than 400 degrees Fahrenheit. The vaporization range is above 600 degrees Fahrenheit and less than about 1,000 degrees Fahrenheit. The operational range of the aft bearing sump is about 600 degrees Fahrenheit to about 1,000 degrees Fahrenheit in one example and 600 degrees Fahrenheit to about 900 degrees Fahrenheit in another example. A transitional range exists between the liquid range and the vaporization range. The transitional range is typically avoided and runs from about 400 degrees Fahrenheit to about 600 degrees Fahrenheit in one example and 450 degrees Fahrenheit to about 550 degrees Fahrenheit in another example.

The air system 38 is configured to provide pressurized air from the gas turbine engine 10 to the aft bearing sump 14 at the appropriate temperature to vaporize the lubricant, cool the bearing 28, and blow vaporized lubricant onto the bearing 28 as suggested in FIG. 2. The air system 38 includes a plurality of bleed lines, a delivery line 44, a fuel-to-air heat exchanger 45, an air-to-air heat exchanger 46, an exhaust-to-lubricant heat exchanger 47, and a plurality of control valves 25, 53 as shown in FIG. 1.

The plurality of bleed lines of the air system 38 includes an inlet bleed line 48, a supply bleed line 49, and an exhaust bleed line 55 as shown in FIGS. 1-1B. The inlet bleed line 48 receives pressurized air from the inlet 18 prior to entering the compressor. The supply bleed line 49 receives heated and pressurized air from the fuel-to-air heat exchanger 45. The exhaust bleed line 55 receives exhaust flow 23 from the exhaust 26 of the gas turbine engine 10. In some examples, the plurality of bleed lines of the air system 38 further includes a tank pressurization line 56 which communicates air from the discharge of the compressor to the lubrication reservoir 36 to pressurize the lubrication reservoir 36 so that a pump may be omitted.

During a start-up mode of operation shown in FIG. 1A, the first valve 25 communicates exhaust 23 from the exhaust bleed line 55 to the exhaust-to-lubricant heat exchanger 47 so that the lubricant in the lubrication reservoir 36 is in the liquid range. At the same time, a second valve 53 moves to communicate exhaust 23 from the exhaust bleed line 55 to the air-to-air heat exchanger 46. Heat is transferred from the exhaust 23 to air from the supply bleed line 49 to raise the temperature to the vaporization range. The mister 24 then provides liquid lubricant into the delivery air stream 22 in the vaporization range in the delivery line 44 as shown in FIG. 1A. The start-up mode of operation occurs until both the lubricant in the lubrication reservoir 36 is in the liquid range and the air in the delivery line 44 is in the vaporization range. In both instances, the exhaust, after transferring heat, is dumped to a vent 40 that opens to atmosphere surrounding the aircraft. Lubricant and air is communicated to exhaust 26 after passing through aft bearing sump 14.

Once the start-up mode of operation is complete, the gas turbine engine 10 transitions to a steady-state mode of operation as shown in FIG. 1B. During the steady-state mode of operation, the first valve 25 moves to block communication of exhaust 23 from the exhaust bleed line 55 to the exhaust-to-lubricant heat exchanger 47. The lubricant in the lubrication reservoir 36 is maintained in the liquid range by insulation surrounding the lubrication reservoir. The insulation protects the lubricant from outside air having temperatures in the vaporization range. At the same time, the second valve 53 moves to communicate relatively cooler air from the inlet bleed line 48 to the air-to-air heat exchanger 46 to maintain the air in the vaporization range and the aft bearing sump in the operation range. In one example, air from the inlet bleed line has a temperature of about 700 degrees Fahrenheit when the engine is moving at about Mach three. Air from inlet bleed line 48 is then dumped to the vent 40 after receiving heat in the air-to-air heat exchanger 46. Lubricant and air is communicated to exhaust 26 after passing through aft bearing sump 14.

As suggested in FIGS. 1-1B, some components of the non-recirculating lubrication system 16 are located outside of the engine core 12 so as to be protected from the heat generated inside engine core 12. In comparison, the temperatures outside of engine core are relatively lower when compared to inside the engine core 12. For example, the air-to-air heat exchanger 46, mister 24, and lubrication reservoir 36 are located outside the engine core 12 so as to be protected from the relatively higher temperatures of the engine core 12. In one example, temperatures in the engine core 12 may exceed 1,000 degrees Fahrenheit while temperatures outside the engine core may be 700 degree Fahrenheit or lower when the aircraft is cruising at Mach three.

The airflow management system 27 includes a front labyrinth seal 60, a first rear labyrinth seal 61, and a second rear labyrinth seal 62 as shown in FIG. 2. The labyrinth seals 60, 61, 62 are made from suitable materials configured to withstand temperatures in the operational range of the aft bearing sump 14. A sump vent 63 is defined between the first and second rear labyrinth seals 61, 62 which is arranged to open into an exhaust vent line 64 as shown in FIGS. 1-1B. The bearing 28 is located, for example, between the front labyrinth seal 60 and the first rear labyrinth seal 61 as shown in FIG. 2. The delivery line 44 provides air and lubricant in the vaporization range into the aft bearing sump 14 at a location between the bearing 28 and the front labyrinth seal 60 as shown in FIG. 2. The combination of front labyrinth seal 60 and rear labyrinth seals 61, 62 cooperate to cause flow in the aft bearing sump 14 to move in one direction only from front to rear.

The delivery line 44 provides air and lubricant in the vaporization range to a plenum arrangement in the aft bearing sump 14. In one example, the plenum arrangement includes multiple orifices equally disposed about the bearing 28. The orifices are directed towards a bearing inner race included in the bearing 28 in order to dispense the air mixture in the desired locations.

Pressure in the aft bearing sump 14 is maintained at or slightly below the forward side buffer pressure so that the amount of buffer air introduced into the aft bearing sump 14 is limited. Flow is directed in one direction as a result of designing clearances of the labyrinth seals 60, 61, 62 and their arrangement so as to establish exhaust vent line 64 as shown in FIG. 2.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A gas turbine engine comprising
an engine core including an inlet, a compressor, a turbine, and an exhaust,
a bearing sump arranged in the engine core and operating at an operational range of about 600 degrees Fahrenheit to about 1,000 degrees Fahrenheit, and
a lubrication system configured to provide a tertiary-butyl phenyl phosphate (TBPP) lubricant to the bearing sump as a vapor, wherein the lubrication system includes a lubrication reservoir configured to store the TBPP lubricant as a liquid, and wherein the lubrication system further includes an air system coupled to the bearing sump and the lubrication reservoir and configured to provide bearing air having a temperature in a vaporization range to the bearing sump.

2. The gas turbine engine of claim 1, wherein the lubrication system further includes a mister coupled to the lubrication reservoir to deliver the TBPP lubricant as the liquid into the bearing air being delivered to the bearing sump and the bearing air causes the TBPP lubricant to change from the liquid to the vapor before the bearing air interacts with the bearing sump.

3. The gas turbine engine of claim 1, wherein the lubrication reservoir is located outside the engine core.

4. The gas turbine engine of claim 3, wherein the lubrication reservoir includes an exhaust-to-lubricant heat exchanger that is configured to transfer heat from exhaust gas provided by the exhaust to the TBPP lubricant to cause the TBPP lubricant to have a temperature in a liquid range when the gas turbine engine is in a start-up mode of operation.

5. The gas turbine engine of claim 4, wherein exhaust gas is blocked from flowing to the exhaust-to-lubricant heat exchanger when the gas turbine engine is in a steady-state mode of operation.

6. The gas turbine engine of claim 5, wherein the lubrication reservoir further includes a layer of insulation coupled to an exterior surface of the lubrication reservoir and configured to control transfer of heat from outside air to the TBPP lubricant.

7. The gas turbine engine of claim 1, wherein the bearing sump includes a bearing including a steel race, ceramic rolling elements, a carbon-composite cage, and an initial dry-film solid coating applied to the steel race.

8. The gas turbine engine of claim 7, wherein the initial dry-film solid coating is worn away from the steel race during a start-up mode of operation of the gas turbine engine to cause the steel race to be exposed to the vapor.

9. The gas turbine engine of claim 8, wherein the vapor reacts with the steel race to form a solid lubricious layer on an outer surface of the steel race during a steady-state mode of operation.

10. A gas turbine engine comprising
an engine core including an inlet, a compressor, a turbine, and an exhaust,
a bearing sump located in the engine core and operating at an operational range of about 600 degrees Fahrenheit to about 1,000 degrees Fahrenheit, and
a lubrication system including a lubrication reservoir located outside the engine core and configured to provide a tertiary-butyl phenyl phosphate (TBPP) lubricant as a liquid lubricant to a stream of air having a temperature in a range of about 600 degrees Fahrenheit to about 800 degrees Fahrenheit to cause the TBPP lubricant to change to a vapor lubricant and be delivered to the bearing sump.

11. The gas turbine engine of claim 10, wherein the bearing sump includes a front seal, a first rear seal spaced apart from the front seal to locate a bearing between the front seal and the first rear seal, a second rear seal located in spaced-apart relation to the first rear seal to locate the first rear seal between the bearing and the second rear seal, and a vent formed in the bearing sump and arranged to open into the bearing sump between the first and the second rear seals.

12. The gas turbine engine of claim 11, wherein the front seal, the first rear seal, and the second rear seal are all labyrinth seals and are configured to move the stream of air and the vapor lubricant in only one direction from the front seal towards and through the vent.

* * * * *